United States Patent Office 3,031,427
Patented Apr. 24, 1962

3,031,427
PROCESS FOR AGGLOMERATING SYNTHETIC LATICES BY FREEZING AND THAWING THE LATEX
Leon Talalay, New Haven, Conn., assignor to The B. F. Goodrich Company, New York, N.Y., a corporation of New York
No Drawing. Filed Aug. 2, 1956, Ser. No. 601,612
8 Claims. (Cl. 260—29.7)

This invention relates to a process for improving the physical properties and characteristics of synthetic latices and pertains more particularly to a method for processing an emulsion-polymerized soap-unsaturated butadiene hydrocarbon polymer synthetic latex to increase the average particle size of polymer particles in the latex and to provide a latex in which the distribution of different size particles of polymer in the latex is more uniform and to a method for producing a concentrated low-viscosity latex.

High solids latices of low viscosity are preferred for use in the manufacture of most products from latex, since a latex which has too high a viscosity is quite difficult to process and since a latex with too low a polymer content is difficult to congeal into a homogeneous firm gel and objectional shrinkage usually is experienced when products made from such low solids latices are dried. Consequently, a latex with a total solids content of at least 50 percent and a viscosity of not over about 3,000 centipoises normally is used. Natural rubber latices are particularly useful for making products directly from latex since they can be concentrated without difficulty by centrifuging or creaming the latex or by evaporation or electro-decantation processes from an initial concentration of about 35 to 40 percent total solids up to concentrations as high as 70 to 73 percent total solids. The concentrated latex is quite fluid, often having a viscosity lower than 1000 centipoises, and is used extensively in the making of foam rubber articles, "dipped" rubber products and molded or cast rubber products.

Unlike natural rubber latices, low solids synthetic latices can not be concentrated above about 45 percent total solids, since above this concentration the viscosity of the latex increases so rapidly that further concentration of the latex is impractical. Also, because of the high viscosity of synthetic latices concentrated above about 45 percent total solids, the latices are not suitable for most purposes for which latices are used. Consequently, it is apparent that a process whereby a low solids synthetic latex could be economically concentrated to a fluid high solids latex would allow synthetic latices to be used to a greater extent in the manufacture of rubber products.

The viscosity of a latex is a function of the size of the particles of polymer in the latex and the proportion of various size particles of polymer in the latex. It has been found that the viscosity of a latex is lowered as the average particle size of polymer in the latex is increased. Probably the reason a natural rubber latex can be concentrated without difficulty to a high concentration without objectionably increasing the viscosity of the latex is because the average particle size of polymer particles in natural rubber latices is relatively large (normally being about 10,000 A.) and the distribution of different size particles of polymer iin natural rubber latices is quite uniform. However, in emulsion-polymerized low solids synthetic latices the proportion of particles of polymer of small size is much greater than the proportion of particles of polymer of medium or large size. Although it is known that the viscosity of the latex would be lowered if the size of particles of polymer in the latex were increased and the distribution of different size particles of polymer in the latex were made more uniform, no convenient and economical way has been known for agglomerating the latex to produce the desired results.

While a synthetic latex with a total solids content and viscosity satisfactory for making rubber products from the latex can be formed by a special polymerization technique, the length of time required to polymerize such a latex is so long that the process is quite uneconomical. However, in the absence of a more suitable process, this process has been used in the manufacture of high solids low temperature polybutadiene and butadiene-styrene (GR–S) latices. In making the polymer, by this process a small amount of water (usually 65 to 85 parts by weight of water for every 100 parts by weight of monomers) is used in the recipe whereby the number of soap micelles which can serve as loci of polymerization is small in comparison to polymerization systems in which normal amounts of water are used. It is believed that by keeping the number of soap micelles low a relatively small number of polymer particles is initiated and, as a consequence, the average particle size of the final latex is larger than if more water were used in the polymerization. However, the "growing" of single polymer particles of relatively large particle size by this "initiation-propagation" technique of polymerization requires an extremely long reaction time. Agglomeration of the polymer particles during polymerization must be carefully controlled by use of suitable stabilizers and electrolytes in the polymerization recipe to prevent the formation of highly undesirable "preflock" in the latex. During polymerization the viscosity of the charge may increase from a viscosity of about 1000 centipoises to a viscosity as high as 25,000 to 30,000 centipoises at about 35 to 45 percent conversion, after which the viscosity will decrease again as polymerization continues. During the period of polymerization when the viscosity of the charge is quite high, suitable agitation of the charge is quite difficult, if not impossible, and heat generated by the polymerization and the mechanical agitation of the charge frequently cannot be satisfactorily dissipated to the cooling jacket or cooling coils of the reactor vessel. As a result, it may become impossible to effectively control the temperature at which polymerization occurs during this period and polymerization may proceed at an undesirably high temperature in the regions of the reactor vessel not immediately adjacent either the agitator or the cooling jacket or coils of the reactor vessel. Excessive amounts of stabilizers may be used to minimize the effect of the excessively high temperatures frequently developed during this period, although more effective results are obtained when oversize agitator equipment is used or the reaction time is materially increased by reducing the rate at which polymerization occurs. Although higher viscosities are experienced when the charge is polymerized at low temperatures (about 40 to 50° F.) as compared to higher polymerization temperatures (for example, 120° F.), difficulties resulting from viscosity increases during polymerization are experienced irrespective of the temperature of polymerization.

Several techniques are known for agglomerating synthetic latices. However, the processes have not been found to be practical for commercial use. Schmidt and Kelsey (Industrial Engineering Chemistry, vol. 43, pages 406–412, 1951) describe the addition of dilute sodium chloride solution to a latex followed by aging of the latex for a time sufficient to effect the desired agglomeration of particles of polymer in the latex. Agglomeration of the latex is arrested by diluting the latex with water, and the latex then is creamed. This agglomeration process is quite slow requiring frequently about eleven days to form agglomerated particles of polymer comparable in size to the particles of polymer in a commercial high solids synthetic latex. Attempts to increase the rate of agglomeration by the addition of larger quantities of sodium chloride is unadvisable since coagulation is likely to occur.

Rumbold (U.S. Patent 2,484,425) describes the addition of acetone (preferably a 60 to 85 percent aqueous solution) to the latex to cause agglomeration of particles of polymer in the latex. The acetone subsequently is removed from the latex by steam stripping and the latex is creamed.

Rhines (U.S. Patent 2,538,273) describes the addition of an alcohol and sodium chloride to the latex after which the pH of the latex is lowered by the addition thereto of an acid or carbon dioxide. After agglomeration has occurred, the pH of the latex is restored by adding ammonia to the latex.

The heretofore known processes for agglomerating synthetic latices are rather cumbersome, are difficult to control reliably, and do not cause agglomeration of the latex to occur rapidly enough to permit the latex to be agglomerated by a continuous operation.

The present invention provides a process whereby the average particle size of polymer in an emulsion-polymerized soap-unsaturated butadiene hydrocarbon polymer synthetic latex can be increased and the distribution of particles of polymer of different size in such latices can be made more uniform and whereby a fluid (low viscosity) latex of high solids content can be made. In accordance with this invention the latex is frozen to a solid condition and then thawed, the latex retaining its homogeneity throughout the process. It is found that the average particle size of polymer in the latex is increased and that the distribution of particles of polymer of different size is more uniform in the thawed latex. Neither cooling the latex to a temperature close to the freezing temperature nor super-cooling the latex below its freezing temperature without actually freezing the latex to a solid phase produces the same agglomeration effect. The thawed latex can be concentrated to a high solids content without a detrimental increase in the viscosity of the latex.

The latices which can be processed in accordance with this invention are emulsion-polymerized aqueous dispersions of butadiene hydrocarbon polymer. The term "butadiene hydrocarbon polymer" as used herein refers to any polymer derived predominantly from a butadiene-1,3 hydrocarbon, such as butadiene-1,3 itself or its homologs such as isoprene, 1,4-dimethyl butadiene-1,3; 2,3-dimethyl butadiene-1,3 and the like, and includes homopolymers of butadiene-1,3 hydrocarbons such as polyisoprene and polybutadiene as well as interpolymers of butadiene-1,3 hydrocarbons with one another or with lesser amounts of one or more other unsaturated monomers copolymerizable therewith such as styrene and substituted styrenes, acrylic and methacrylic acids and their esters and nitriles, vinyl pyridene and other unsaturated vinyl and vinylidene monomers. Particularly preferred latices for use in this invention are latices derived by the emulsion copolymerization of a butadiene-1,3 hydrocarbon with a lesser amount of styrene, commonly known as butadiene-styrene copolymer latices or GR–S latices. Other preferred latices for use in this invention are the nitrile latices which are aqueous dispersions of emulsion polymerized interpolymers of a butadiene-1,3 hydrocarbon with lesser amounts of acrylonitrile.

Since it is essential in utilizing the present invention that the latex be frozen to a solid phase, it is apparent that only latices which can be frozen to a solid condition without coagulating objectionably can be processed by the method of this invention. Also, it has been found that surface-saturated latices (a latex in which the surfaces of the particles of polymer in the latex are completely covered with emulsifier) cannot be agglomerated in accordance with this invention. It is preferable that latices be used which have been polymerized using as an emulsifier a fatty acid soap, preferably a sodium or potassium soap of cocoanut oil, lauric acid and oleic acid, or potassium myristate. The process of this invention is applicable for processing latices of any concentration, although agglomeration is more pronounced in latices of higher solids content, probably because the polymer particles are in closer physical relationship with one another whereby a greater number of polymer particles can more readily combine into a single particle. Consequently, if a low solids latex is to be agglomerated by the process of this invention, it is preferable that the latex be concentrated in a conventional manner to a total solids content up to about 40 percent before it is agglomerated.

The latex may be frozen to a solid state in any convenient way, although it is preferable that the latex be frozen as rapidly as possible. The latex then is thawed, preferably as rapidly as possible, to reconstitute a fluid latex. The frozen latex need not be retained in a frozen condition for more than a moderate time (5 to 30 seconds being sufficient), since apparently agglomeration of the latex occurs either at the time the latex changes from a fluid to the frozen solid phase and/or at the time the frozen latex changes from the solid to the fluid state upon thawing. Excellent results have been obtained by freezing the latex on the surface of a slowly revolving metal drum which is partly immersed in a reservoir of latex to be processed. As the drum revolves, latex is deposited on the surface of the drum as the drum surface is withdrawn from the reservoir of latex. The drum is internally cooled with brine so that the temperature of the surface of the drum is below the freezing temperature of the latex whereby the thin layer of latex adhering to the surface of the drum is completely frozen within a very short time (usually within about 20 to 30 seconds). The frozen layer of latex is scraped from the surface of the drum into a heated agitator tank in which the frozen latex is rapidly thawed, and the thawed latex then is drained from the tank. It should be noted that throughout the freezing and thawing operations the latex retains its homogeneity (that is, the particles of polymer remain uniformly dispersed in the aqueous phase of the latex) and does not separate into two separate aqueous phases one of which is highly concentrated in polymer and the other of which contains a low concentration of polymer.

The thawed latex can be concentrated without difficulty by centrifuging or creaming the latex or by evaporation or electro-decantation processes to a much higher total solids content than can the same latex which has not been frozen and thawed as described above. It has also been found that further agglomeration of the latex frequently occurs during the concentration of the latex and that re-freezing and re-thawing the concentrated latex normally will result in an additional agglomeration of the latex.

The invention is illustrated by the following examples; however, it will be understood that the invention is not limited to these specific illustrations.

EXAMPLE 1

A low-solids butadiene-styrene latex (GR–S latex Type No. X–617) having a concentration of 24.6 percent total solids and a pH of 10.5 can be concentrated in a disc-concentrator at room temperature to a total solids content of 45 to 48 percent, at which concentration the viscosity of the latex will have increased to about 2750 to 3000 centipoises (at 30° C. and 60 r.p.m. Brookfield). If it is attempted to further concentrate the latex, the viscosity of the latex increases so rapidly that additional concentration of the latex is difficult and impractical.

The latex was frozen to a solid condition in stainless steel tanks 30 inches long, 12 inches high and ⅜ inch wide by immersing the tanks in a 10° F. alcohol bath for 15 minutes. The tanks were removed from the bath and the frozen latex was thawed by spraying warm water onto the exterior surfaces of the tanks and pouring the latex from the tanks as it melted.

The distribution of different size particles of polymer in the latex was determined before the latex was frozen and also after the frozen latex had been thawed and the results of such determinations are shown in Table I. (The distribution determinations are made by centrifuging a diluted sample of latex for a suitable time and determining the solids content of samples taken from different levels in the centrifuge tube.) A comparison of the distribution of different size particles in the latex before it had been frozen with that of the latex which was frozen and thawed reveals that agglomeration has occurred as a result of freezing and thawing the latex. In the original latex only 16 percent of the particles had diameters greater than 1000 A. whereas in the latex which had been frozen and thawed 28 percent of the particles had diameters greater than 1000 A.

The latex which has been frozen and thawed as described above was concentrated without difficulty in a disc-concentrator at room temperature from its original total solids content of 24.6 percent to a total solids content of 62.0 percent and the concentrated latex has a viscosity of only 1730 centipoises after being diluted to a total solids content of 60.0 percent. Further agglomeration of the latex occurred as a result of the concentration of the latex as shown by a comparison of the distribution of different size particles of polymer in the concentrated latex with that of the frozen and thawed unconcentrated latex (Table I).

The concentrated latex (60.0 percent total solids) then was refrozen and thawed in metal tanks in the same manner previously described and the distribution of different size particles of polymer of the refrozen and thawed concentrated latex indicated that refreezing and thawing the latex had caused additional agglomeration of the latex to occur (see Table I). The viscosity of the refrozen and thawed concentrated latex (at 60.0 percent total solids) was only 174 centipoises as compared to 1,730 centipoises for the concentrated latex before it was refrozen.

Table I

| Diameter | Original X-617 latex, percent | Frozen-thawed latex, percent | Frozen-thawed concentrated latex, percent | Refrozen-thawed concentrated latex, percent |
|---|---|---|---|---|
| Particles under— | | | | |
| 1,000 A | 84.0 | 72.0 | 51.0 | 37.0 |
| 2,000 A | 93.5 | 93.0 | 84.5 | 65.0 |
| 3,000 A | 98.0 | 97.5 | 95.0 | 85.0 |
| 4,000 A | 99.0 | 99.0 | 97.5 | 92.5 |

EXAMPLE 2

A low-solids butadiene-styrene latex (GR-S Type No. X-617) had a total solids content of 26.4 percent and a pH of 10.5. The pH of the latex was lowered with carbon dioxide to a pH of 8.75, and the latex was frozen and thawed as described in Example 1. Agglomeration of the latex occurred as a result of freezing and thawing the latex as shown by a comparison of the distribution of different size particles of polymer in the latex before it was frozen with that of the latex after it was frozen (see Table II).

The thawed latex was concentrated in a disc-concentrator to a total solids content of 66.7 percent. Concentrating the latex caused further agglomeration of the latex to occur as indicated by a comparison of the distribution of different size particles of polymer in the concentrated latex with the distribution of different size particles of polymer in the unconcentrated thawed latex (see Table II).

The concentrated latex then was refrozen and thawed, as described in Example I, and the distribution of different size particles of polymer in the refrozen and thawed latex indicated that the concentrated latex had further agglomerated after being refrozen and thawed (see Table II).

The viscosity of the concentrated latex diluted to 60.0 percent total solids was 199 centipoises. Upon freezing and thawing the concentrated latex the viscosity of the latex (at 60.0 percent total solids) was only 134 centipoises.

Table II

| Diameter | Original X-617 latex, percent | Frozen-thawed latex, percent | Frozen-thawed concentrated latex, percent | Refrozen-thawed concentrated latex, percent |
|---|---|---|---|---|
| Particles under— | | | | |
| 1,000 A | 84.0 | 55.5 | 32.0 | 25.5 |
| 2,000 A | 93.5 | 80.0 | 67.5 | 55.0 |
| 3,000 A | 98.0 | 93.5 | 91.0 | 74.5 |
| 4,000 A | 99.0 | 97.0 | 95.5 | 84.0 |

EXAMPLE 3

A low-solids butadiene-styrene latex had a total solids content of 31.7 percent and a pH of 9.9. The latex was deposited in a thin layer on the surface of a metal drum by revolving the drum partially immersed in the latex. The latex was completely frozen on the surface of the metal drum within 15 to 20 seconds by maintaining the surface of the metal drum at 0° F. After the latex had remained completely frozen for about 15 seconds, it was scraped from the surface of the metal drum into a heated tank and rapidly thawed. The average particle size of polymer and the distribution of different size particles of polymer in the latex were determined before the latex was frozen and also after the latex had been frozen and thawed (Table III). The determinations show that the average particle size of polymer in the latex after it was frozen and thawed is more than five times greater than the average particle size of polymer in the latex before it was frozen and that the distribution of different size particles of polymer in the latex is much more uniform after the latex was frozen and thawed.

Table III

| Diameter | Original latex, percent | Frozen-thawed latex, percent |
|---|---|---|
| Particles under— | | |
| 500 A | 97.4 | 13.5 |
| 1,000 A | 97.6 | 13.5 |
| 1,500 A | 97.8 | 49.5 |
| 2,000 A | 98.0 | 78.5 |
| 3,000 A | 98.1 | 95.3 |
| 4,000 A | 98.2 | 97.6 |
| Average particle diameter | 370 A. | 2,010 A |

EXAMPLE 4

A high-solids butadiene-styrene latex (GR-S Type No. T-3009) had a total solids content of 54.3 percent and a pH of 9.7. The pH of the latex was reduced to 8.75 with carbon dioxide, and the latex was frozen on a revolving metal drum at −5° F. within 15 to 20 seconds and then rapidly thawed as described in Example 3. The average particle size of polymer in the latex had increased and the distribution of different size particles in the latex was more uniform as a result of freezing and thawing the latex (see Table IV). The viscosity of the original latex was 1920 centipoises whereas the thawed latex had a viscosity of only 96 centipoises.

The thawed latex then was concentrated by "creaming" the latex using ammonium alginate as the creaming agent and the pH of the concentrated latex was adjusted to a pH of 9.2 with carbon dioxide and refrozen and thawed. The thawed latex then was concentrated by "creaming" the latex using ammonium alginate. The concentrated latex had a total solids content of 63.5 percent and a viscosity of 1320 centipoises. The concentrated latex after having been refrozen and recreamed was further agglomerated (see Table IV).

*Table IV*

| Diameter | Unfrozen latex, percent | Frozen-thawed latex, percent | Creamed-refrozen-thawed-recreamed latex, percent |
|---|---|---|---|
| Particles under— | | | |
| 500 A | 60.2 | | 12.8 |
| 1,000 A | 80.8 | 29.4 | 23.8 |
| 1,500 A | 92.0 | 57.6 | 46.0 |
| 2,000 A | 94.6 | 76.4 | 66.0 |
| 3,000 A | 94.6 | 89.9 | 82.0 |
| 4,000 A | 94.6 | 91.4 | 84.9 |

EXAMPLE 5

A butadiene-acrylonitrile latex having a total solids content of about 33 percent was frozen and thawed as described in Example 3 at a temperature of 0° F. The average particle diameter of the latex increased from an average diameter of less than 500 A. in the latex before it was frozen to an average diameter of 3000 A. in the latex after it had been frozen and then thawed.

EXAMPLE 6

A polyisoprene polymer latex (21 percent total solids) was rapidly frozen to a solid condition at −19° C. and then thawed. The surface tension of the latex before being frozen was 49.3 dynes per centimeter and the surface tension of the latex after being frozen and subsequently thawed was only 44.6 dynes per centimeter indicating that agglomeration of the latex had occurred.

It has been found that the conditions at which the latex is frozen and then thawed affect the degree of agglomeration which occurs in the latex. The temperature at which the latex is frozen may be any temperature at which the latex will freeze to a solid condition which is above a temperature at which complete coagulation of the latex occurs. Preferably the latex is frozen at a temperature as low as possible since agglomeration is more pronounced the lower the temperature at which the latex is frozen, as illustrated by the following example.

EXAMPLE 7

Samples of a butadiene-styrene latex were frozen at 28° F., 15° F. and 0° F. in the manner described in Example 3, and then were thawed. It was found that the lower the temperature at which the latex is frozen, the greater the agglomeration effected as shown by the distribution of different size particles in the latex samples and the average diameter of particles in the samples (see Table V).

*Table V*

| Diameter | Original latex, percent | Frozen at 28° F., percent | Frozen at 15° F., percent | Frozen at 0° F., percent |
|---|---|---|---|---|
| Particles under— | | | | |
| 500 A | 97.2 | 20.0 | | 14.0 |
| 1,000 A | 97.5 | 30.0 | | 14.5 |
| 1,500 A | 97.7 | 72.0 | | 50.5 |
| 2,000 A | 97.8 | 80.0 | | 68.0 |
| 3,000 A | 98.0 | 89.0 | | 94.5 |
| 4,000 A | 98.2 | 97.5 | | 97.5 |
| Average particle diameter | 370 A. | 1,205 A. | 1,760 A. | 2,010 A. |

However, at lower freezing temperatures approaching temperatures at which complete coagulation of the latex will occur, the presence of coagulum may be noticed in the thawed latex. If the amount of coagulum formed in the latex would be objectionable, considering the purpose for which the latex is intended to be used, the amount of coagulum formed in the latex can be reduced or completely eliminated by freezing and/or by thawing the latex more rapidly and/or by freezing the latex at a higher temperature. Usually it is objectionable if the latex contains more than about 1.0 percent coagulum and preferably the coagulum content of the latex should not exceed about .2 percent. Normally, it is desirable to freeze the latex at from 30 to −50° F., preferably from 15 to −20° F.

The latex preferably is frozen as rapidly as possible since it has been found that agglomeration is improved the faster the latex is frozen. Also, the latex is less likely to form coagulum or to completely coagulate upon freezing if the latex is frozen rapidly, as shown by the following illustration.

EXAMPLE 8

A butadiene-styrene latex was frozen to a solid condition at −10° F. in about 20 seconds on a revolving metal drum as described in Example 3, and was then thawed. The thawed latex contained a negligible amount of coagulum and had been successfully agglomerated as indicated by a comparison of the distributions of different size particles in the latex measured before the latex was frozen and after the latex had been thawed (Table VI).

*Table VI*

| Diameter | Before freezing, percent | After thawing, percent |
|---|---|---|
| Particles under— | | |
| 500 A | 97.0 | 15.7 |
| 1,000 A | 97.3 | 30.0 |
| 2,000 A | 97.5 | 69.5 |
| 3,000 A | 97.7 | 79.4 |
| 4,000 A | 98.5 | 86.0 |

However, when the same butadiene-styrene latex was frozen slowly in an 8 oz. vessel immersed in a 20° F. bath (a freeze time of over one-half hour being necessary to freeze the latex to a solid mass) and then thawed, the latex was almost completely coagulated as a result of being frozen slowly.

It is desirable that the latex be frozen to the solid state within 5 minutes, preferably within 1 minute, after it is subjected to the temperature at which it is to be frozen.

As indicated above, the length of time the latex is maintained frozen has little effect on the degree of agglomeration obtained. For example, samples of a butadiene-styrene latex (having 66.7 percent total solids content and a pH of 9.25) were frozen and the viscosity of the latex was measured after the latex had been frozen for 15 minutes and for 270 minutes at 10° F. The viscosity of the latex was greatly reduced after it had been frozen for 15 minutes and was not materially changed as a result of holding the frozen latex at the freezing temperature for the longer time (see Table VII). The reduced viscosity of the latex resulting from freezing and thawing the latex is an indication that agglomeration has taken place, since the viscosity of a latex is reduced with an increase in the mean particle size of polymer in the latex.

*Table VII*

| Minutes latex frozen at 10° F. | Viscosity at 30° C. (centipoise) |
|---|---|
| 0 | 13,400 |
| 15 | 1,100 |
| 270 | 1,210 |

The latex should be thawed as rapidly as possible since it has been found that more coagulum tends to be formed in the latex if it is thawed slowly than when the latex is more rapidly thawed, as illustrated by the following example.

EXAMPLE 9

A butadiene-styrene latex was frozen on a revolving metal drum as described in Example 3. The frozen latex was scraped from the metal drum into a jacketed vessel partially filled with previously thawed agglomerated latex. It was observed that over 1.0 percent coagulum was present in the thawed latex when the temperature of the latex in the "melt" tank was maintained at about 30° to 33° F. whereas only 0.1 percent coagulum was found in the latex if the latex were thawed more rapidly by maintaining the temperature of the latex in the "melt" tank between 50° to 60° F.

The pH of the latex has an effect on the degree of agglomeration obtained, better agglomeration being obtained the lower the pH of the latex, as illustrated by the following examples.

EXAMPLE 10

A butadiene-styrene latex (27 percent total solids content) had a pH of 9.2 and an average particle diameter of 472 A. The pH of samples of the latex were adjusted either with ammonia to increase the pH of the latex or with carbon dioxide to decrease the pH of the latex to the values shown in Table VIII. The samples of latex were frozen and then thawed and the average particle diameter of polymer in each sample of latex and the surface tension of the latex samples were determined (see Table VIII). Referring to Table VIII, it is seen that a greater degree of agglomeration occurs the lower the pH of the latex. It will be observed that this example illustrates that the surface tension of a latex decreases as the latex is agglomerated.

Table VIII

Before freezing

|  | Original latex | Latex samples |  |  |  |
|---|---|---|---|---|---|
|  |  | (1) | (2) | (3) | (4) |
| pH | 9.2 | 10.0 | 9.2 | 8.5 | 8.0 |

After being frozen and thawed

|  | | | | | |
|---|---|---|---|---|---|
| Surface tension (dynes per centimeter) | 65.8 | 40.7 | 38.5 | 32.6 | 28.9 |
| Average particle diameter | 472 A. | 1,502 A. | 1,600 A. | 1,985 A. | 2,260 A. |

EXAMPLE 11

A butadiene-acrylonitrile latex had a pH of 10.9. The pH of samples of the latex were adjusted with carbon dioxide to the values shown in Table IX and the samples were frozen and thawed as described in Example 3. A higher degree of agglomeration of the latex occurred as the pH of the latex was lowered as shown by increased average particle diameters of polymer in the latex as the pH of the latex is lowered (see Table IX).

Table IX

Before freezing

|  | Original Latex | Latex samples | | |
|---|---|---|---|---|
|  |  | (1) | (2) | (3) |
| pH | 10.9 | 10.9 | 9.8 | 8.8 |

After being frozen and thawed

| | | | | |
|---|---|---|---|---|
| Average particle diameter | <500 A. | 650 A. | 850 A. | 1,430 A. |

However, reducing the pH of a latex has the effect of destabilizing the latex and too great a reduction in pH of the latex will cause the latex to coagulate when frozen, particularly if the latex is frozen at a relatively low temperature. If coagulation of the latex occurs when it is frozen, either the pH of the latex and/or the temperature at which the latex is frozen should be raised to overcome this condition. For example, it was found that a butadiene-styrene latex having a pH of 8.0 would coagulate if frozen at −22° F., but without adjusting the pH the latex would agglomerate successfully when frozen at 14° F. and would agglomerate successfully even at the lower freezing temperature (−22° F.) if the pH of the latex were adjusted by the addition of ammonia to a pH of 10.0.

As indicated previously, surface-saturated latices are not agglomerated by freezing and subsequently thawing the latex. However, the amount and type of emulsifier used in making a surface-unsaturated latex (a latex in which the particles of polymer in the latex are not completely covered with emulsifier) has an effect on the degree of agglomeration which will occur when the latex is frozen and then thawed. If too little of the surface area of the particles of polymer in a latex is covered with emulsifier, the latex will be relatively unstable and cannot be frozen at low temperatures and pH without coagulating. The addition of soap emulsifier to the latex before the latex is frozen will allow the pH of the latex to be lowered without causing coagulation of the latex upon being frozen if the initial surface-coverage of the particles of polymer in the latex is not too low, and as a result a greater degree of agglomeration frequently occurs.

As mentioned previously, the degree of agglomeration realized by freezing and thawing a latex increases with the concentration of the latex, as shown by the following example.

EXAMPLE 12

Samples of latex having concentrations varying from 10 to 45 percent were prepared from a 29 percent total solids butadiene-styrene latex by either diluting the latex with water or concentrating the latex. The samples were frozen and thawed under the same conditions, and the surface tension of the thawed latex samples were measured. The surface tensions of the thawed latex samples showed that the higher the concentration of the latex, the greater the degree of agglomeration obtained (see Table X).

Table X

| Latex concentration, percent total solids | Surface tension of latex after being frozen and subsequently thawed, dynes/cm. |
|---|---|
| 10 | 43.5 |
| 20 | 40.7 |
| 30 | 37.7 |
| 40 | 35.6 |
| 45 | 34.0 |

The surface tension of the original unfrozen latex was 72.0 dynes/cm.

The latex may be agglomerated in accordance with this invention quite economically and the agglomerated material when concentrated, if necessary, to a total solids content above about 50% is particularly useful for making foam rubber products, "dipped" rubber articles and molded or cast rubber articles.

The application is a continuation-in-part application of my copending application Serial No. 393,519, filed November 20, 1953, now abandoned.

It will be clear that obvious variations and modifications of this invention may be made without departing from the spirit and scope of this invention as defined in the appended claims.

I claim:
1. A process for producing a low-viscosity synthetic latex of high solids content from a fluid emulsion-polymerized synthetic latex which comprises freezing a fluid emulsion-polymerized synthetic latex containing as the polymer constituent a polymer which contains a predominant amount of a butadiene-1,3 hydrocarbon in polymerized form, the surfaces of the polymer particles of said latex being incompletely covered with emulsifier, said latex being frozen to a solid frozen mass at a temperature above temperatures at which said latex coagulates, the particles of polymer of said latex being substantially uniformly dispersed in the frozen latex, reconstituting a fluid latex comprising the entire mass of said frozen mass of latex by completely thawing said frozen mass of latex whereby a fluid latex is obtained having polymer particles of increased size, and concentrating the fluid thawed latex to the desired high solids content.

2. A process for producing a low-viscosity synthetic latex of high solids content from a fluid emulsion-polymerized synthetic latex having an average polymer particle size substantially smaller than the normal average polymer particle size of natural rubber latex which comprises reducing the pH of a fluid emulsion-polymerized synthetic latex having an average polymer particle size substantially smaller than the normal average polymer particle size of natural rubber latex and containing as the polymer constituent a polymer which contains a predominant amount of a butadiene-1,3 hydrocarbon in polymerized form, the surfaces of the polymer particles of said latex being incompletely covered with emulsifier, to a pH above pH values sufficient to cause coagulation of said latex, rapidly freezing said latex to a solid frozen mass with the particles of polymer of said latex substantially uniformly dispersed in the frozen latex, said latex being frozen at a temperature above temperatures at which said latex coagulates, reconstituting a fluid latex comprising the entire mass of said frozen mass of latex by completely thawing said frozen mass of latex whereby a fluid latex is obtained having polymer particles of increased size, and concentrating the fluid thawed latex to the desired high solids content.

3. A process for producing a low-viscosity synthetic latex of high solids content from a fluid emulsion-polymerized synthetic latex having an average polymer particle size smaller than 4000 A. which comprises freezing a fluid emulsion-polymerized synethetic latex having an average polymer particle size smaller than 4000 A. and containing as the polymer constituent a polymer which contains a predominant amount of a butadiene-1,3 hydrocarbon in polymerized form, the surfaces of the polymer particles of said latex being incompletely covered with emulsifier, said latex being frozen to a solid mass at a temperature between 30° to —50° F. and at a temperature above temperatures at which said latex coagulates and within five minutes after said latex is subjected to the freeze temperature, the particles of polymer of said latex being substantially uniformly dispersed in the frozen latex, reconstituting a fluid latex comprising the entire mass of said frozen mass of latex by completely thawing said frozen mass of latex whereby a fluid latex is obtained having polymer particles of increased size, and concentrating the fluid thawed latex to the desired high solids content.

4. A process for producing a low-viscosity synthetic latex of high solids content from a fluid emulsion-polymerized synthetic latex having an average polymer particle size substantially smaller than the normal average polymer particle size of natural rubber latex which comprises freezing a fluid emulsion-polymerized synthetic latex having an average polymer particle size substantially smaller than the normal average polymer particle size of natural rubber latex and containing as the polymer constituent a butadiene-styrene copolymer which contains a predominant amount of a butadiene-1,3 hydrocarbon in polymerized form, the surfaces of the polymer particles of said latex being incompletely covered with emulsifier, said latex being frozen to a solid frozen mass at a temperature above temperatures at which said latex coagulates, the particles of polymer of said latex being substantially uniformly dispersed in the frozen latex, reconstituting a fluid latex comprising the entire mass of said frozen mass of latex by completely thawing said frozen mass of latex whereby a fluid latex is obtained having polymer particles of increased size, and concentrating the fluid thawed latex to the desired high solids content.

5. A process for producing a low-viscosity synthetic latex of high solids content from a fluid emulsion-polymerized synthetic latex having an average polymer particle size substantially smaller than the normal average polymer particle size of natural rubber latex which comprises reducing the pH of a fluid emulsion-polymerized synthetic latex having an average polymer particle size substantially smaller than the normal average polymer particle size of natural rubber latex and containing as the polymer constituent a butadiene-styrene copolymer which contains a predominant amount of a butadiene-1,3 hydrocarbon in polymerized form, the surfaces of the polymer particles of said latex being incompletely covered with emulsifier, to a pH above pH values sufficient to cause coagulation of said latex, freezing said latex to a solid frozen mass with the particles of polymer of said latex substantially uniformly dispersed in the frozen latex, said latex being frozen at a temperature above temperatures at which said latex coagulates, reconstituting a fluid latex comprising the entire mass of said frozen mass of latex by completely thawing said frozen mass of latex whereby a fluid latex is obtained having polymer particles of increased size, and concentrating the fluid thawed latex to the desired high solids content.

6. A process for producing a low-viscosity synthetic latex of high solids content from a fluid emulsion-polymerized synthetic latex having an average polymer particle size smaller than 4000 A. which comprises freezing a fluid emulsion-polymerized synthetic latex having an average polymer particle size smaller than 4000 A. and containing as the polymer constituent a butadiene-styrene copolymer which contains a predominant amount of a butadiene-1,3 hydrocarbon in polymerized form, the surfaces of the polymer particles of said latex being incompletely covered with emulsifier, said latex being frozen to a solid mass at a temperature between 30° to —50° F. and at a temperature above temperatures at which said latex coagulates and within five minutes after said latex is subjected to the freeze temperature, the particles of polymer of said latex being substantially uniformly dispersed in the frozen latex, reconstituting a fluid latex comprising the entire mass of said frozen mass of latex by completely thawing said frozen mass of latex whereby a fluid latex is obtained having polymer particles of increased size, and concentrating the fluid thawed latex to the desired high solids content.

7. A process for producing a low-viscosity synthetic latex of high solids contact from a fluid emulsion-polymerized synthetic latex having an average polymer particle size substantially smaller than the normal average polymer particle size of natural rubber latex which comprises freezing a fluid emulsion-polymerized fatty acid soap-emulsified synthetic latex having an average polymer particle size substantially smaller than the normal average polymer particle size of natural rubber latex and containing as the polymer constituent a polymer which contains a predominant amount of a butadiene-1,3 hydrocarbon in polymerized form, the surfaces of the polymer particles of said latex being incompletely covered with emulsifier, said latex being frozen to a solid frozen mass at a temperature above temperatures at which said latex coagulates, the particles of polymer of said latex being substantially uniformly dispersed in the frozen latex, reconstituting a fluid latex comprising the entire mass of said frozen mass of latex by completely thawing said frozen mass of latex whereby a fluid latex is obtained having polymer particles of increased size, and concentrating the fluid thawed latex to the desired high solids content.

8. A process for producing a low-viscosity synthetic latex of high solids content from a fluid emulsion-polymerized synthetic latex having an average polymer particle size substantially smaller than the normal average polymer particle size of natural rubber latex which comprises freezing a fluid emulsion-polymerized fatty acid soap-emulsified synthetic latex having an average polymer particle size substantially smaller than the normal average polymer particle size of natural rubber latex and containing as the polymer constituent a butadiene-styrene copolymer which contains a predominant amount of a butadiene-1,3 hydrocarbon in polymerized form, the surfaces of the polymer particles of said latex being incompletely covered with emulsifier, said latex being frozen to a solid frozen mass at a temperature above temperatures at which said latex coagulates, the particles of polymer of said latex being substantially uniformly dispersed in the frozen latex, reconstituting a fluid latex comprising the entire mass of said frozen mass of latex by completely thawing said frozen mass of latex whereby a fluid latex is obtained having polymer particles of increased size, and concentrating the fluid thawed latex to the desired high solids content.

References Cited in the file of this patent

UNITED STATES PATENTS

| | | |
|---|---|---|
| 2,131,333 | Schweinitz | Sept. 27, 1938 |
| 2,444,801 | Arundale | July 6, 1948 |
| 2,481,876 | Rhines | Sept. 13, 1949 |
| 2,548,802 | Linscott | Apr. 10, 1951 |
| 2,683,689 | Gehring | July 13, 1954 |
| 2,702,285 | Bebb et al. | Feb. 15, 1955 |

FOREIGN PATENTS

| | | |
|---|---|---|
| 726,466 | Great Britain | Mar. 16, 1955 |

OTHER REFERENCES

Maron et al.: "Journal of American Chemical Society," volume 70, pages 582–7, particularly page 586, February 1948.

Whitby: "Synthetic Rubber," Wiley & Sons, Inc., New York City, page 656.